United States Patent [19]

Moriya

[11] 4,263,998
[45] Apr. 28, 1981

[54] FREE TRAVEL ADJUSTING DEVICE FOR A CABLE-OPERATED CLUTCH RELEASE SYSTEM

[75] Inventor: Yoshikazu Moriya, Toyota, Japan

[73] Assignee: Toyota Jidosha Kogyo Kabushiki Kaisha, Toyota, Japan

[21] Appl. No.: 969,868

[22] Filed: Dec. 15, 1978

[30] Foreign Application Priority Data

Dec. 27, 1977 [JP] Japan .................. 52-179510

[51] Int. Cl.³ .......................................... F16D 13/75
[52] U.S. Cl. ............................. 192/110.R; 74/501 R;
74/512; 192/30 V; 192/99 S
[58] Field of Search ............... 192/99 S, 111 R, 30 V,
192/101, 110 R; 74/501.5, 489, 512, 501 R;
248/609, 635, 56; 188/2 D; 403/192, 243

[56] References Cited

U.S. PATENT DOCUMENTS

| | | | |
|---|---|---|---|
| 1,778,992 | 10/1930 | Wulfert | 248/635 |
| 2,138,176 | 11/1938 | Keys | 248/635 X |
| 2,858,150 | 10/1958 | Neher et al. | 403/243 X |
| 3,901,363 | 8/1975 | DeGrazia | 192/99 S X |
| 3,929,031 | 12/1975 | Webb | 74/501 R |
| 3,941,215 | 3/1976 | Schoch | 188/2 D X |
| 4,023,653 | 5/1977 | Yoshigai | 74/489 X |
| 4,131,379 | 12/1978 | Gordy et al. | 74/501 R X |

FOREIGN PATENT DOCUMENTS

| | | | |
|---|---|---|---|
| 52-8899 | 2/1977 | Japan | 192/30 V |
| 52-26656 | 6/1977 | Japan | 192/30 V |
| 658504 | 10/1951 | United Kingdom | 188/2 D |

*Primary Examiner*—Rodney H. Bonck
*Attorney, Agent, or Firm*—Oblon, Fisher, Spivak, McClelland & Maier

[57] ABSTRACT

A free travel adjusting device for a cable-operated clutch release system for an automobile. A cylindrical cable holder for holding a clutch cable is mounted through an impact absorbing member to a dash panel in the engine room of the automobile. The clutch cable has in its portion received in the cable holder an external thread with which a wing nut is threadedly connected. A means for preventing rotation of the wing nut is provided between the wing nut and the cable holder.

1 Claim, 3 Drawing Figures

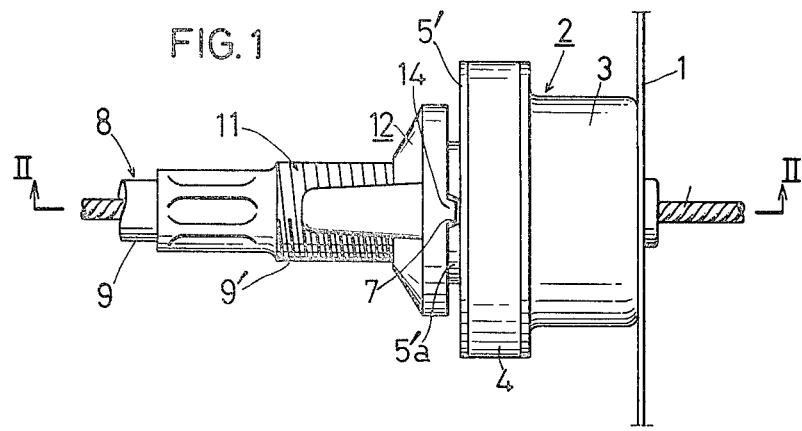
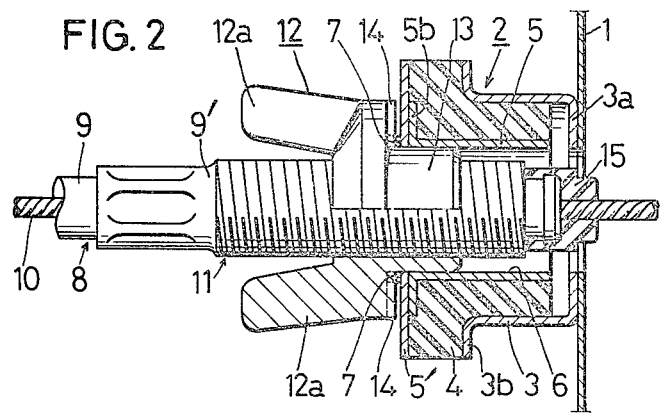
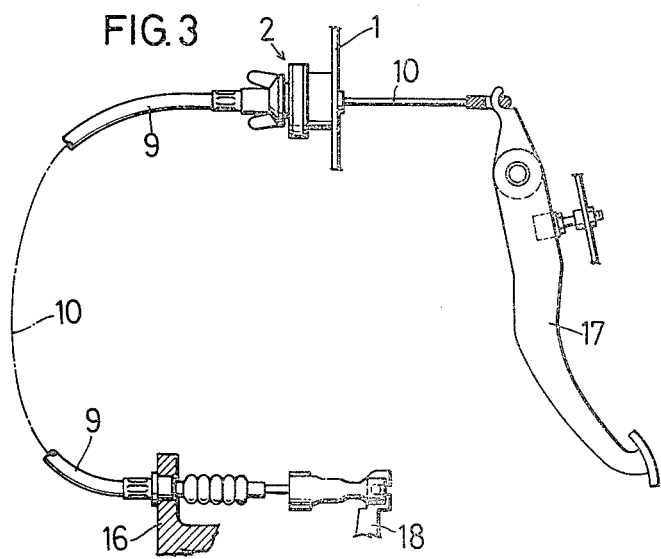

FREE TRAVEL ADJUSTING DEVICE FOR A CABLE-OPERATED CLUTCH RELEASE SYSTEM

The present invention relates to a free travel adjusting device for a cable-operated clutch release system for an automobile.

In a cable-operated clutch release system, the amount of free travel of a clutch pedal becomes inadequate upon permanent deformation or elongation of the inner cable of a clutch cable or upon wear of the clutch disc of a friction clutch. To correct the amount of such free travel of the clutch pedal, the length of the casing of the clutch cable is controlled between a dash panel and a clutch housing.

In a conventional cable-operated clutch release system, the casing of the clutch cable is provided with a plurality of grooves arranged at a certain pitch, to which E-rings are selectively mounted to control the length of the casing. However, since there is a limit in the pitch of the grooves, the minimum range of adjustment of the free travel is inevitably limited. Further, there must be utilized a specific tool for mounting the E-rings to the grooves.

In another conventional cable-operated clutch release system, the casing cap is threaded to engage with a pair of hexagon nuts for controlling the length of the casing. In this construction, the free travel of the clutch pedal is more precisely adjustable. However, since a pair of double nuts are used for preventing displacement of the hexagon nuts, a specific tool is necessary to loosen the double nuts and then tighten them after the hexagon nuts are properly located. It is difficult to utilize such a specific tool in the narrow working space of the engine room. Further, it is difficult in this construction to prevent transmission of vibration and noise from the friction clutch to a dash panel through the clutch cable.

It is an object of the present invention to provide a free travel adjusting device for a cable-operated clutch release system which can easily and precisely adjust the amount of free travel of a clutch pedal in a narrow working space.

It is another object of the present invention to provide a free travel adjusting device for a cable-operated clutch release system which can prevent transmission of vibration and noise from a friction clutch to a dash panel through a clutch cable.

It is still another object of the present invention to provide a free travel adjusting device for a cable-operated clutch release system which functions to protect an external thread provided in a clutch casing.

The invention will now be described in further detail by way of example with reference to the accompanying drawings, in which:

FIG. 1 is a plan view of a part of a cable-operated clutch release system;

FIG. 2 is a cross-sectional view taken along the lines II—II in FIG. 1; and

FIG. 3 is a general view showing the cable-operated clutch release system.

Referring now to FIGS. 1 and 2 of the drawings, a cable holder 2 is provided in the engine room of an automobile on the left-hand side of a dash panel 1. The cable holder 2 comprises a cylindrical outer holder 3, a cylindrical inner holder 5 coaxial with the outer holder 3 and having a through hole 6 and an impact absorbing member 4 of rubber interposed therebetween. The right-hand end of the outer holder 3 is bent to form a radially inwardly extending flange 3a which is fixed to the dash panel 1 by welding while the left-hand end of the same is bent to form a radially outwardly extending flange 3b. The left-hand end of the inner holder 5 is bent to form a radially outwardly extending flange 5b to which an annular plate 5' having a center hole equal in diameter to the through hole 6 is welded. The annular plate 5' is equal in outer diameter to the flange 3b of the outer holder 3. The annular plate 5' has an annular projection 5'a in its end opposite to the welded surface. The annular projection 5'a is provided with a pair of recesses 7 in the upper and lower portions of its outer periphery (see FIG. 2).

A clutch cable 8 comprises a tubular casing 9 and an inner cable 10 passing therethrough. One end of the casing 9 is covered with a cap 9' having an external thread 11 in its outer periphery and inserted into the through hole 6 of the cable holder 2. The outer diameter of the cap 9' is smaller than the inner diameter of the through hole 6 so that an appropriate clearance is made between the outer periphery of the cap 9' and the inner periphery of the through hole 6 for preventing mutual interference (see FIG. 2). The other end of the casing 9 is secured to a part of a clutch housing 16 as shown in FIG. 3.

The right-hand end of the inner cable 10 as viewed in FIG. 3 is connected to a clutch pedal 17, and the left-hand end of the same is connected to the release fork 18 of a friction clutch (not shown).

The external thread 11 of the cap 9' is provided with a wing nut 12, the arms 12a of which are manually rotatable in the engine room. The wing nut 12 is integrally provided with a perpendicularly stepped cylindrical portion 13 of smaller diameter which is smoothly inserted into the through hole 6 of the cable holder 2. The clutch cable 8 is thus held by the cable holder 2 through insertion of the cylindrical portion 13 into the through hole 6.

The wing nut 12 has a pair of projections 14 engaged with the recesses 7 of the annular plate 5' for preventing rotation of the wing nut 12 with respect to the external thread 11. The wing nut 12 may alternatively have a pair of recesses and a pair of projections engageable therewith may be provided in the inner holder 5. Numeral 15 shows a dust seal cap made of rubber.

In operation, when permanent deformation of the inner cable 10 causes the amount of free travel of the clutch pedal 17 to exceed an appropriate level, the clutch cable 8 is pulled in the left-hand direction in FIGS. 1 and 2 to disengage the projections 14 of the wing nut 12 from the recesses 7 of the inner holder 5. Then the wing nut 12 is manually rotated in the engine room to move along the external thread 11 of the cap 9' in the right-hand direction in FIGS. 1 and 2 so that the projections 14 are re-engaged with the recesses 7. By virtue of this, the casing 9 is lengthened between the dash panel 1 and the clutch housing 16 to decrease the amount of free travel of the clutch pedal 17 to the extent compensating the permanent deformation of the inner cable 10.

When the wing nut 12 is fully moved in the right-hand direction along the external thread 11, there may substantially be no free travel of the clutch pedal 17. Thereafter the wing nut 12 is pulled back in the left-hand direction at a certain distance to obtain proper free travel of the clutch pedal 17. Then the projections 14 of the wing nut 12 are engaged with the recesses 7 of the inner holder 5 to prevent rotation of the wing nut 12.

When the amount of free travel of the clutch pedal 17 comes too small by, for example, wear of the clutch facing (not shown) of the friction clutch, the wing nut 12 is pulled in the left-hand direction to correct the amount of the free travel of the clutch pedal 17.

While the invention has been described with reference to a preferred embodiment thereof, it is to be understood that modifications or variations may be easily made without departing from the scope of this invention which is defined by the appended claims.

What is claimed is:

1. In a cable-operated clutch release system for an automobile, a free travel adjusting device comprising:
   a cable holder having an impact absorbing member and mounted through said impact absorbing member to a dash panel in the engine room of said automobile;
   a clutch cable inserted into said cable holder and having an external thread in a portion received in said cable holder;
   a wing nut threadedly connected with said external thread to loosely engage with said cable holder;
   a means provided between said wing nut and said cable holder for preventing rotation of said wing nut;
   wherein said cable holder comprises a cylindrical outer holder mounted to said dash panel in said engine room, and a cylindrical inner holder coaxial with said outer holder for receiving said clutch cable, wherein said impact absorbing member is a member of rubber interposed between said outer and inner holders, and wherein said wing nut is loosely engageable with said inner holder; and
   wherein said inner holder has a radially outwardly extending flange in its end engaged with said wing nut, and said rotation preventing means comprises a pair of recesses formed in an annular projection provided on said flange and a pair of projections provided in said wing nut and engageable with said recesses, whereby said cable holder both absorbs impact and prevents rotation of said wing nut.

* * * * *